May 3, 1932. J. SCHILLER 1,856,594
CORD HOLDING CLIP
Filed April 28, 1931
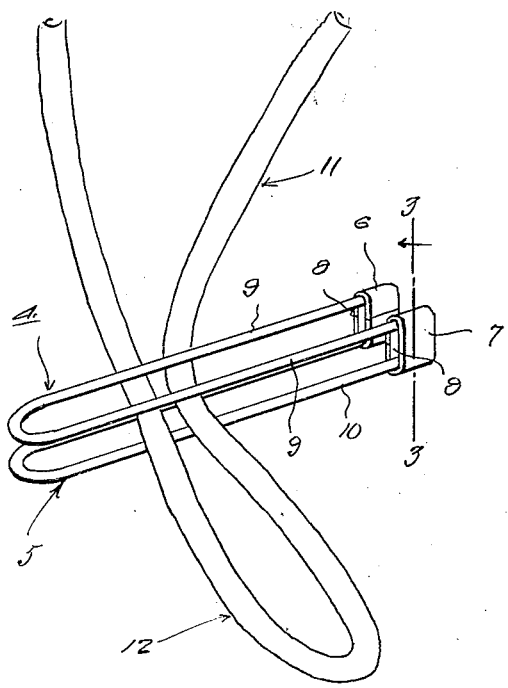
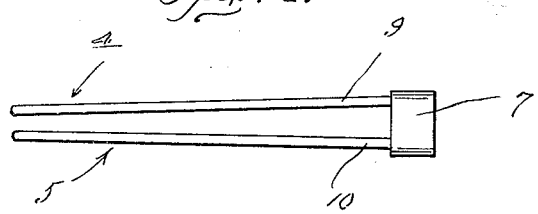
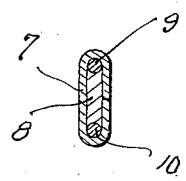
Inventor
John Schiller
By Clarence A. O'Brien
Attorney Patented May 3, 1932

1,856,594

UNITED STATES PATENT OFFICE

JOHN SCHILLER, OF WESTERN SPRINGS, ILLINOIS

CORD HOLDING CLIP

Application filed April 28, 1931. Serial No. 533,552.

This invention relates to a clip for office and home accessories, especially, but not necessarily, designed for application to an electricity conducting cord to aid in suspending or holding the cord in an elevated position.

It is a matter of common knowledge that electricity conducting cords used in connection with various electrical machines and appliances are frequently of such excess length as to permit the cords to become entangled because of excess slack or to allow the cords to rest on the floor in an inconvenient and frequently troublesome manner.

The present invention comprehends a simple and economical resilient clip susceptible of quick application and removal and capable of maintaining surplus or excess portions of the cord in a doubled condition in such a way as to relieve the cord of excess slack and to permit it to be drawn sufficiently taut as to allow it to be suspended off of the floor at the point between the electrical appliance and the source of current supply.

In the drawings:

Figure 1 is a perspective view showing the improved device and the manner in which it is used.

Figure 2 is a side elevational view of the same.

Figure 3 is a detail section on the line 3—3 of Figure 1.

Referring to the drawings in detail, it will be observed that the complete device is of exceptionally simple construction, comprises a pair of companion resilient wire grips or jaws 4 and 5 connected in assembled relation to occupy a substantially spaced parallel relationship as seen in Figure 1.

Each jaw is formed from a single length of wire bent upon itself in U-shaped form and the free ends of the arms of the respective U-shaped members are connected together. This is accomplished by utilizing a pair of thimbles or ferrules 6 and 7 of duplicate construction. As seen in Figure 3 the ferrule is somewhat elongated in cross sectional shape and formed from a strap of metal and fitted into the ferrule is a core or filler block 8 which serves as a spacing and retaining member which has its upper and lower edges grooved to receive the wire ends 9 and 10 of the respective jaws 4 and 5.

The electric cord is denoted by the numeral 11 in Figure 1 and in order to shorten the cord all that is necessary is to double it upon itself to form a sort of a loop as indicated at 12 and to insert this loop between the jaws 4 and 5. This takes up the necessary surplus slack and permits the invention to fulfill the requirements in a desirable manner.

It is thought that the description, taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. An accessory of the class described comprising a pair of substantially spaced parallel resilient gripping elements, duplicate means maintaining said gripping elements in assembled relationship, and companion spacing and retaining elements fitted into each duplicate means.

2. As a new product of manufacture, an electric cord clip of the class described comprising a pair of spaced superposed parallel companion gripping elements, said gripping elements each comprising a resilient U-shaped member, and means securing the open ends of each member together in assembled relationship.

3. As a new article of manufacture, an electrical cord clip of the class described comprising a pair of companion resilient gripping jaws, each jaw being formed from a single length of wire bent upon itself into U-shaped configuration, a pair of opposed grooved blocks interposed between the free end portions of the corresponding arms of said jaws, and ferrules embracing the blocks and end portions to maintain said jaws in assembled spaced parallelism.

In testimony whereof I affix my signature.

JOHN SCHILLER.